UNITED STATES PATENT OFFICE.

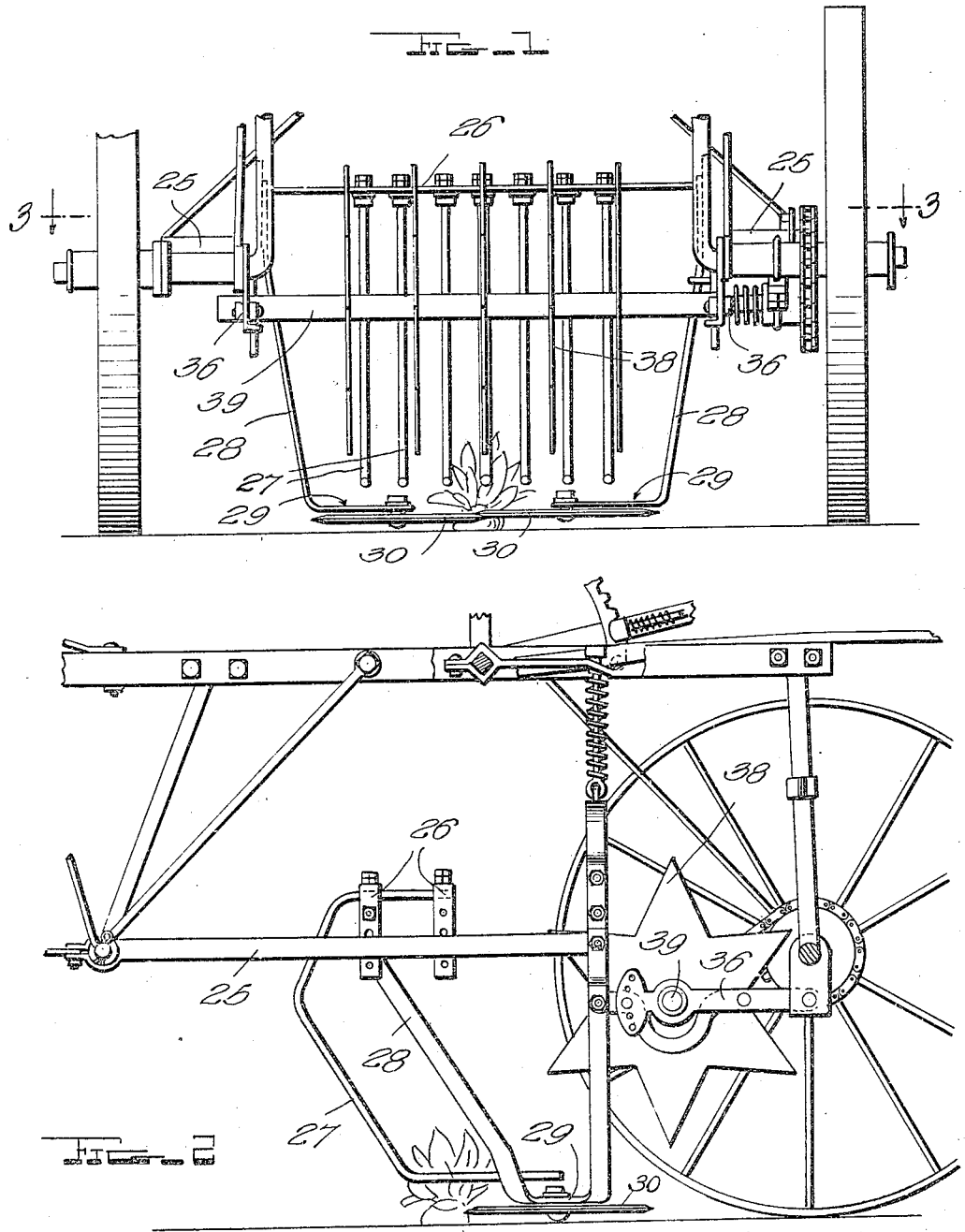

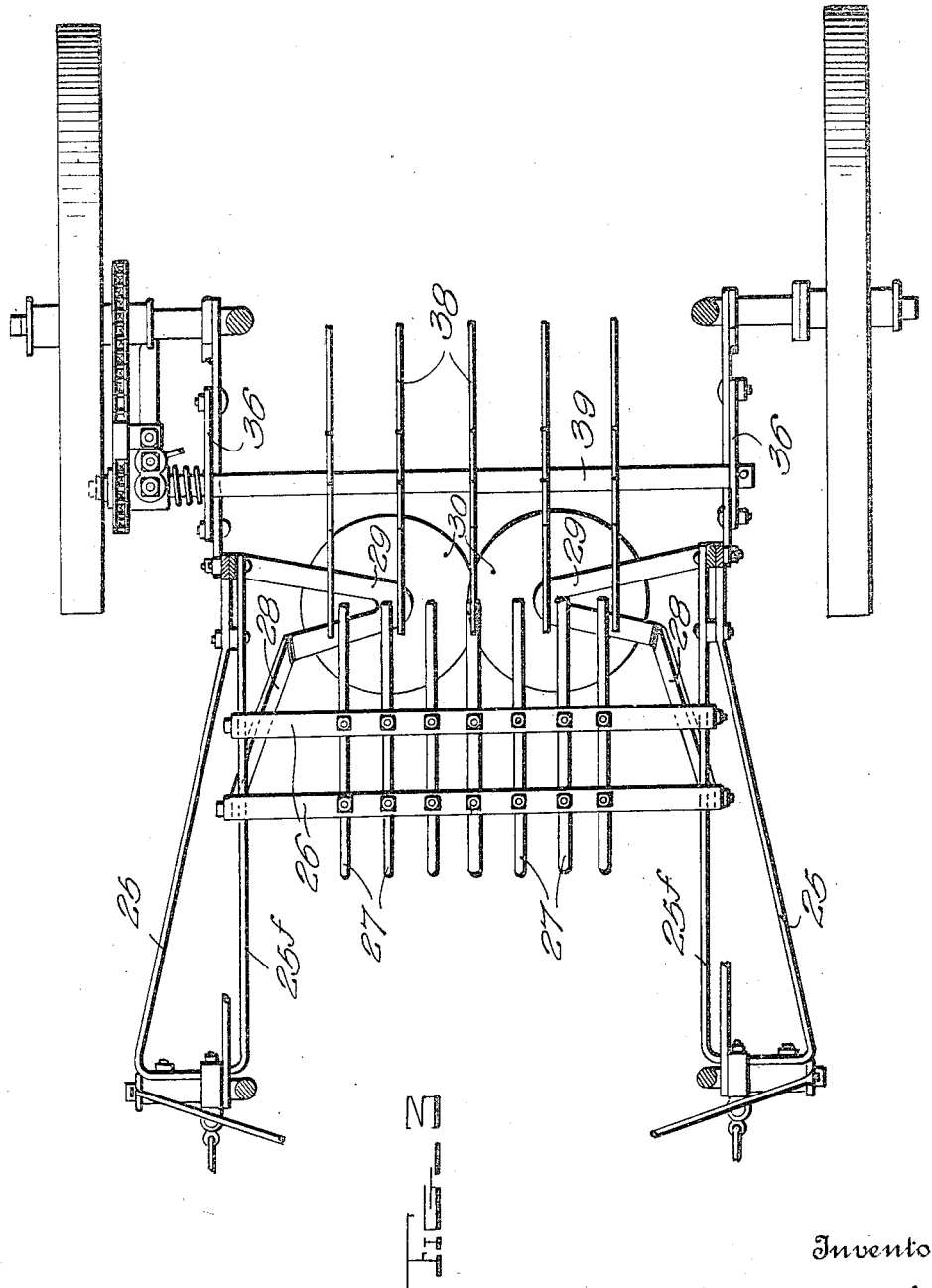

ROBERT E. DEWART, OF MILFORD, INDIANA.

BEET-TOPPER.

1,254,004.  Specification of Letters Patent.  Patented Jan. 15, 1918.

Original application filed September 26, 1916, Serial No. 122,254. Divided and this application filed August 25, 1917. Serial No. 188,130.

*To all whom it may concern:*

Be it known that I, ROBERT E. DEWART, a citizen of the United States, residing at Milford, in the county of Kosciusko and State of Indiana, have invented new and useful Improvements in Beet-Toppers, of which the following is a specification.

My present invention pertains to beet-topping machines; and it consists in the organized beet-topping mechanism hereinafter described and claimed.

In the accompanying drawings, which are hereby made a part hereof:

Figure 1 is a rear elevation of my novel mechanism.

Fig. 2 is a side elevation of the same.

Fig. 3 is a horizontal section taken in the plane indicated by the line 3—3 of Fig. 1.

Similar numerals of reference designate corresponding parts in all of the view of the drawings.

The carrying means of my novel beet-topping mechanism preferably, though not necessarily, comprises vertically-swinging arms 25 and bars 36 which are connected with a wheeled frame as shown herein and specifically disclosed in my contemporary application filed Sept. 26, 1916, Serial Number 122,254, of which this application is a division.

Fixed to and extending between the inner portions 25$^f$ of the arms 25 are cross bars 26 to which are fixed the upper horizontal portions of downwardly and rearwardly extending parallel fingers 27 which constitute the gage of my mechanism.

Also fixed to said arms 25 are hangers 28 provided with inwardly extending horizontal portions 29 to which are pivotally connected horizontal, lapped topping knives 30.

Journaled in the bars 36 of the carrying means are the end portions of a driven shaft 39 on which are fixed in spaced and staggered relation a plurality of toothed, vertically-disposed clearing beaters 38 which have for their function to displace the beet tops and clear the topping knives and the gage so that the mechanism will be in condition to operate to the best advantage at all times. The topping knives 30 are not driven. The clearing beaters 38, however, are driven preferably from one of the ground wheels in the manner specifically set forth in my parent application.

In the practical use of my device and when the machine comprising my improved mechanism is drawn by draft animals along a row of beets, the gage formed by the fingers 27 will ride over the beets and correctly position the topping knives 30 with respect to the beets irrespective of the extent to which the beets protrude above the ground. It will also be manifest that the beets caught between the knives 30 will be neatly topped, and coincident with the operation of the knives 30 and the gage fingers 27, the clearing beaters 38, will by virtue of their teeth or points operate to displace the beet tops and keep the gage and the topping knives at all times clear so that the mechanism will operate to the best advantage at all times.

The lower rearwardly-extending portions of the gage fingers 27 rest above the knives 30 and serve the additional function of longitudinally-disposed supports for the beet tops, from which supports the teeth or points of the beaters 38 are able to quickly and thoroughly remove the tops.

Having described my invention, what I claim and desire to secure by Letters-Patent, is:

1. In a beet topping machine, the combination of carrying means, horizontally-disposed lapped topping knives, of circular disk form, carried by said carrying means, longitudinal spaced gage fingers carried by the carrying means and extending rearwardly above and in spaced relation to the said disk-like topping knives, and vertically-disposed, spaced and driven clearing beaters carried by the carrying means and arranged in a transverse series above and in rear of the topping knives and the gage fingers.

2. In a beet topping machine, the combination of carrying means comprising spaced arms and bars connected with and extending in rear of said arms, a cross-bar fixed to and extending between said arms, hangers connected with the arms and having lower inwardly-extending horizontal portions, horizontally-disposed lapped topping knives, of circular disk form, pivoted on said portions, longitudinal spaced gage fingers fixed to and extending downwardly from said cross bar and then horizontally rearward above and in spaced relation to the knives, a transverse driven shaft journaled in the said bars of the carrying means, and spaced clearing beaters fixed on said shaft and provided with teeth and arranged above and in rear of the topping knives and the gage fingers.

In testimony whereof I have hereunto set my hand in presence of two subscribing witnesses.

ROBERT E. DEWART.

Witnesses:
RAY DEAHL,
L. BURR WHIPPY.

Copies of this patent may be obtained for five cents each, by addressing the "Commissioner of Patents, Washington, D. C."